May 29, 1951  J. R. MILLER  2,554,630
EYEGLASS CLEANER
Filed Oct. 24, 1949

JOHN R. MILLER,
INVENTOR.

BY John Flam
ATTORNEY

Patented May 29, 1951

2,554,630

UNITED STATES PATENT OFFICE 2,554,630

EYEGLASS CLEANER

John R. Miller, Los Angeles, Calif.

Application October 24, 1949, Serial No. 123,280

2 Claims. (Cl. 15—214)

This invention relates to eyeglass cleaners.

It is common to provide small pieces of cloth or tissue for wiping or polishing eyeglass lenses. Often such cloth or tissue is treated with material intended to enhance the effectiveness of the cleaner.

When using these materials, a firm grip must be maintained on the frame of the eyeglasses while one of the lenses is subjected to a brisk polishing action. Since some of the parts of the frame may be quite delicate, this process of polishing or cleaning creates some danger of breakage. Furthermore, such materials are often kept in a haphazard fashion, with an attendant likelihood of collecting dirt that may injure the lens surfaces.

It is one of the objects of this invention to provide an eyeglass lens cleaner or polisher that is free of these disadvantages.

It is another object of this invention to provide a simple and effective eyeglass cleaner and polisher that remains useable for long periods, and that may be washed if desired.

It is another object of this invention to make it possible simultaneously to polish or clean both lenses, and without danger of breakage.

This invention possesses many other advantages and has other objects which may be more clearly apparent from a consideration of one embodiment of the invention. For this purpose there is shown a form in the drawings accompanying and forming part of the present specifications. The form will now be described in detail, illustrating the general principles of the invention; but it is to be understood that this detailed description is not to be taken in a limiting sense, since the scope of this invention is best defined by the appended claims.

Referring to the drawings.

Figure 1:
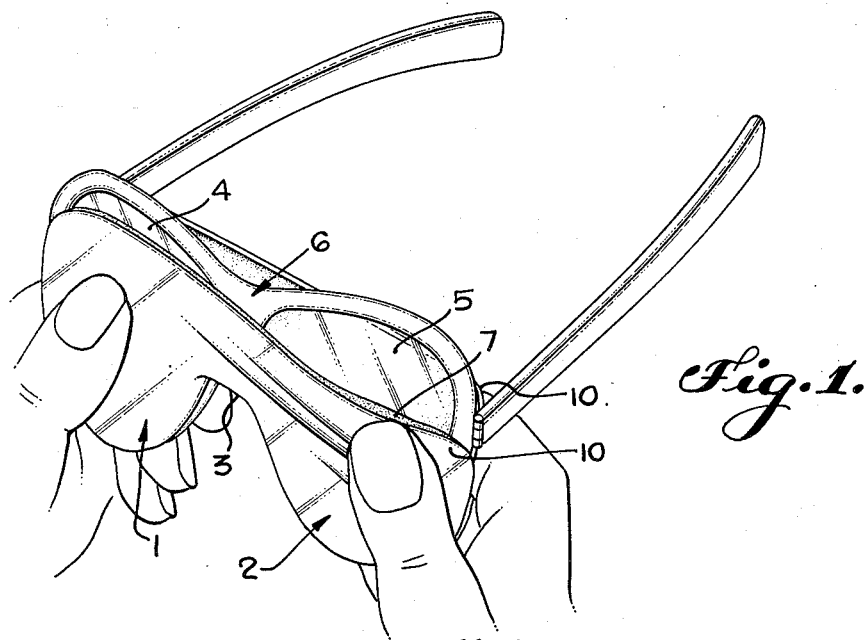
Figure 1 is a pictorial view illustrating a cleaner embodying the invention in use.
Figure 2:
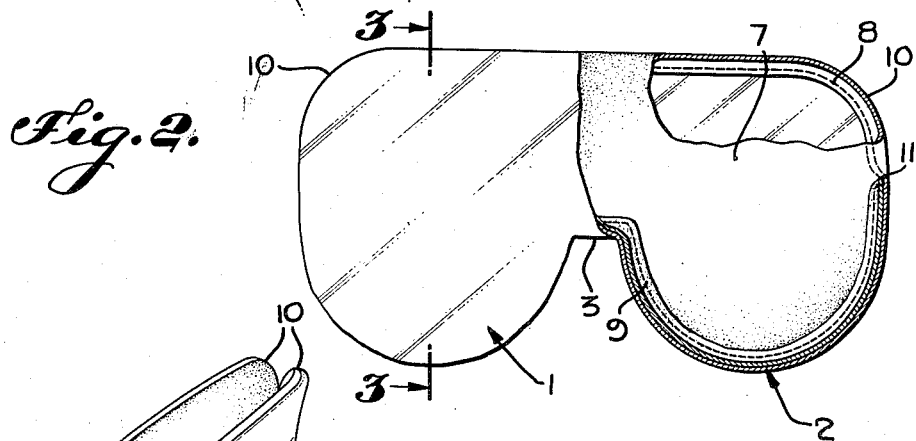
Fig. 2 is an elevation, partly broken away, of the cleaner shown in Fig. 1.
Figure 3:
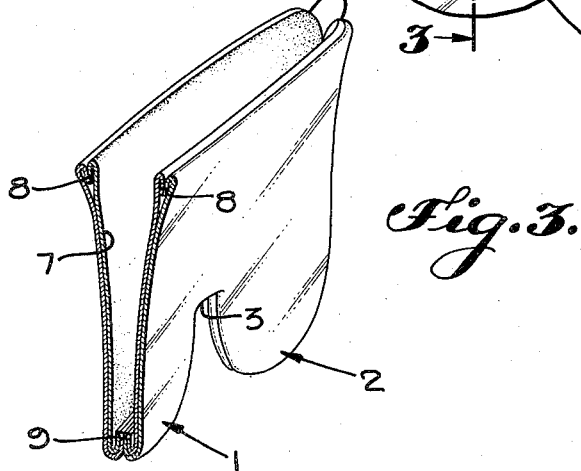
Fig. 3 is a pictorial view of the cleaner, shown, as in section, along a plane corresponding to line 3—3 of Fig. 2.

In general, the cleaner includes a pair of flat pockets 1 and 2 made from thin pliant material, such as a thin plastic. These pockets are joined by a shallow intermediate portion 3. The top of the cleaner is open, as indicated most clearly in Figs. 1 and 3. The spacing of the pockets 1 and 2 is such as to correspond generally to the lenses 4 and 5, supported in an eyeglass frame 6. The shallow part 3 corresponds to the bridge of the frame.

A lining 7 of the cleaning material is provided for the pockets. This lining may be made, for instance, of two pieces of outing flannel, or other suitable fabric. If desired, it may be impregnated with a cleaning compound. Each piece of fabric forms a side of the pockets.

In use, the glass lenses 4 and 5 are slipped into the pockets 1 and 2; then the pockets are engaged respectively by the fingers on opposite sides of the pockets; and the fingers are vigorously moved to move the pocket lining 7 along the lenses for a polishing operation.

Conveniently, the lining is sewn into the outer pocket material as, for example, by the concealed seams 8 and 9. Both of the fabric lining pieces 7 may be first sewn along seams 8 at the top open edge of the pockets, and downwardly for a short distance along the outer edges of the pockets 1, 2, to a point 11. Then the pieces 7 may be inverted to be received within the pockets 1 and 2; the pockets may now be turned inside-out to permit the sewing of seam 9 along the bottom of the pockets and of the shallow portion 3 for connecting the two sides of the structure. The outer ends of the seam extend substantially to the point 11, below the open top of the cleaner to meet seams 8. This provides side flaps 10, facilitating easy movement of the cleaner over the lens surfaces.

The cleaner may be conveniently kept in an eyeglass case, and may be left on the lenses when the eyeglass is placed in the case. The entire device is readily washable to renew its utility.

The inventor claims:

1. An article of manufacture serving solely as an eyeglass cleaner to facilitate the simultaneous cleaning of both lenses of a pair of eyeglasses, consisting of an elongated shallow open pocket made of outer and inner layers of material highly pliable to finger manipulation, said layers being secured to each other along their edges, the pocket being closed along the elongated bottom edge and partly along the ends, the inner layer being made of lens cleaning material; the pocket being dimensioned to receive both lenses and lens bearing portions of a pair of eyeglasses, and said partly closed ends providing for the outward projection of the temples, whereby both lenses may be cleaned by the finger manipulation of both faces of the pocket.

2. The article set forth in claim 1 whereby the lower closed edge of the elongated pocket has a medial inwardly directed portion forming two communicating lens receiving sections.

JOHN R. MILLER.

REFERENCES CITED

The following references are of record in the file of this patent:

UNITED STATES PATENTS

| Number | Name | Date |
|---|---|---|
| 1,025,372 | Conrad | May 7, 1912 |
| 1,074,671 | Waterman | Oct. 7, 1913 |
| 1,177,752 | Wilson | Apr. 4, 1916 |
| 2,277,371 | Simpson | Mar. 24, 1942 |
| 2,367,182 | Brown | Jan. 16, 1945 |
| 2,427,043 | Brown | Sept. 9, 1947 |
| 2,530,746 | Wetherby | Nov. 21, 1950 |

FOREIGN PATENTS

| Number | Country | Date |
|---|---|---|
| 258,417 | Great Britain | Sept. 23, 1926 |
| 738,616 | France | Oct. 18, 1932 |